United States Patent Office 3,652,598
Patented Mar. 28, 1972

3,652,598
INTERNAL DIANHYDRIDE OF 2,2',3,3'-TETRA-CARBOXY BENZOPHENONE
Ronald L. Broadhead, Addison, Ill., assignor to Standard Oil Company, Chicago, Ill.
No Drawing. Continuation-in-part of application Ser. No. 25,548, Apr. 29, 1960. This application Oct. 8, 1963, Ser. No. 314,593
Int. Cl. C07d 1/00
U.S. Cl. 260—346.3   1 Claim

ABSTRACT OF THE DISCLOSURE

The novel anhydrides of my invention can be represented in general by the following structural formua:

wherein R is a phenyl radical containing a carboxylic anhydride group, i.e. a group having the structural formula:

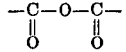

which is attached to adjacent positions on said phenyl radical. The remaining positions on said phenyl radical may be substituted with various aryl radicals; specific examples of such substituted dianhydrides are the phenyl-substituted tetracarboxylic dianhydrides, carboxyphenyl-substituted tetracarboxylic dianhydrides, naphthyl-substituted tetracarboxylic dianhydrides, carboxynaphthyl-substituted tetracarboxylic dianhydrides, benzoyl-substituted tetracarboxylic dianhydrides, carboxybenzoyl-substituted tetracarboxylic dianhydrides, and the like, wherein the dianhydride groups are in the 2,3,2',3', and 3,4,3',4' positions.

---

This invention relates to new compositions which are intramolecular dianhydrides of benzophenone tetracarboxylic acids. More specifically, my invention pertains to the new and useful internal dianhydrides of 2,2',3,3'-tetracarboxybenzophenone and 3,3',4,4' - tetracarboxybenzophenone. This application is a continuation-in-part of my copending application Ser. No. 25,548, filed Apr. 29, 1960, now U.S. Patent 3,108,085.

The novel benzophenone tetracarboxylic dianhydrides of my invention are useful as components of resin compositions. They are particularly useful in the preparation of air-drying, surface coating resins and find further use in the preparation of high-temperature-stable foam compositions, such as the reaction products of the dianhydrides with diisocyanates, for example, with tolylene diisocyanate, diphenylmethane diisocyanate, and the like.

The new anhydrides of my invention can be prepared, in general, by stepwise oxidation and dehydration reactions carried out on hydrocarbon analogues of the desired products according to methods known to the art, specific examples of which are set forth hereinbelow.

The starting materials for preparation of my novel compounds are such as 2,2',3,3' - tetramethyl-diphenyl methane; 3,3',4,4' - tetramethyldiphenyl methane; 2,2', 3,3' - tetramethyl - 4 - phenyl-diphenyl methane; 3,3',4,4'-tetramethyl-5-naphthyl diphenyl methane; 2,2',3,3'-tetramethyl-4-benzoyl diphenyl methane, and the like. As will be understood from the citation of the last specific starting material, partially oxidized derivatives of hydrocarbon compounds are also suitable starting materials.

The preparation of my novel compositions can be effected by oxidation of a hydrocarbon feed, such as described herein, according to the procedure disclosed in U.S. Pat. 2,833,816, issued to Saffer et al. and U.S. Pat. 3,038,940, issued to Serres et al. This procedure is a liquid phase oxidation process catalyzed with a heavy metal and bromine. Since the presence of a substituent in the ortho position of an aromatic ring of a hydrocarbon starting material tends to increase the difficulty of oxidizing the methylene bridge in a diaryl methane compound, it may be desirable in such cases to employ the oxidation technique described in U.S. Pat. 2,806,059, issued to Bruson et al. This oxidation method is disclosed to bring about oxidation of a methylene bridge even when an ortho substituent group is present. When a substituted benzophenone is selected as a starting material, oxidation is accomplished readily according to the first procedure set forth above; and for this reason, partially oxidized intermediate compounds are sometimes to be preferred over hydrocarbons as starting materials.

A clear understanding of my invention can be obtained by reference to the following experiments, which are described in detail. These experiments are exemplary only and are not to be construed as limiting the scope of my invention.

A 3,3',4,4' - tetracarboxy benzophenone is prepared by the liquid phase oxidation of the corresponding hydrocarbon, in acetic acid solvent, and with the aid of a manganese bromide catalyst, according to the procedure set forth in U.S. Pat. 2,833,816.

A 20 g. sample of 3,3'4,4' - tetracarboxy benzophenone prepared as described above, is heated at about 225° C. for 6 hours in a calcining furnace. Upon subsequent cooling, there is recovered about 17.5 g. of an orange solid, which is the 3,4,3',4' - dianhydride of tetracarboxybenzophenone. The properties of the dianhydride product are as follows:

Molecular weight: 317±16 (Theoretical: 322)
Acid number: 693 (Theoretical: 697)
Melting point, ° C.: 222–225
Carbon, Hydrogen analysis: C,63.4%; H, 1.9% Calculated. C, 64.0%; H, 2.4% Found.

Infrared analysis for functional and structural groups indicated the presence of anhydride, carbonyl and phenyl groups.

In the calcining of the corresponding 2,2',3,3' - tetracarboxy benzophenones, a considerable proportion of the product may consist of internal lactones which must be separated from the desired dianhydride according to ordinary procedures known to art.

An air-dried, surface coating resin can be produced from a dianhydride according to the procedure set forth in my copending application Ser. No. 25,548. An example of such preparation is as follows:

About 16.2 g. of butyl carbitol (0.1 mol), 26.6 g. of linseed fatty alcohols (0.10 mol), and 32.0 g. of 3,4,3',4'-dianhydride of tetracarboxy benzophenone (0.10 mol) are heated together for 2 hours at 127 to 140° C., and then at 170–175° C. for about 1.75 hours. A 49.6 g. quantity of distilled soya monoglycerides (0.14 mol) is next added and the total charge is heated for an additional 7.5 hours at 170–175° C. There is obtained a brown viscous resin.

A 30.0 g. sample of the above resin is dissolved in a solution of 2.3 g. 2-amino-2-methyl-1-propanol in 120 ml. of distilled water. To this solution is added 2.5 g. of a cobalt drier (containing 6 percent by weight of cobalt) and 27.0 g. of titanium dioxide. A film of this material, when applied to wood, is found to dry in about 45 minutes to one hour. After 24 hours, such a film shows good resistance to water; after 7 days of drying, a very tough, hard film results.
Having described my invention, what I claim as novel is:
1. An organic carboxylic dianhydride having the structural formula:
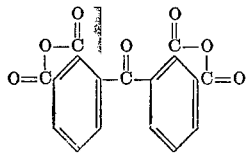
References Cited
UNITED STATES PATENTS
3,078,279  2/1963  McCracken ------- 260—346.3
HENRY R. JILES, Primary Examiner
U.S. Cl. X.R.
260—22, 63, 75, 517